A. E. KEHL.
MACHINE AND HAND TAP.
APPLICATION FILED JUNE 16, 1914.
1,256,138.
Patented Feb. 12, 1918.
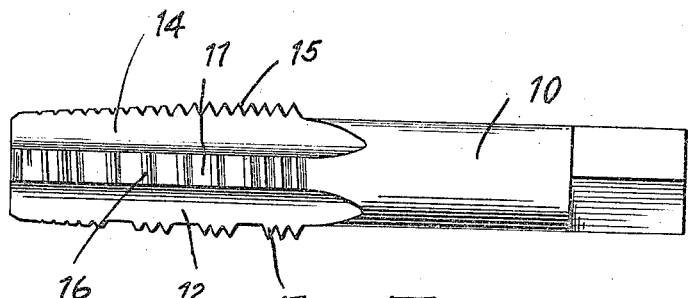
Fig.1.
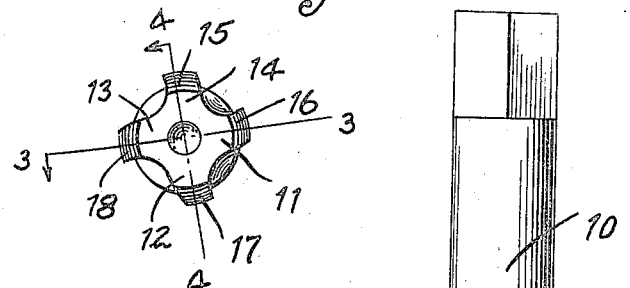
Fig.2.
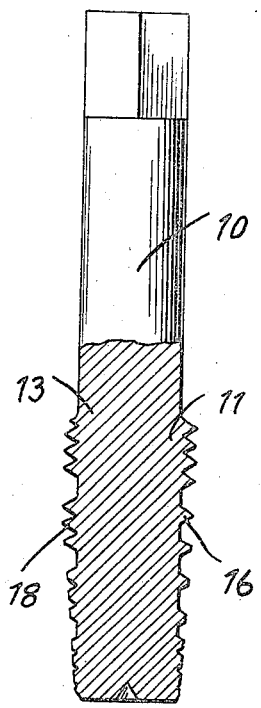
Fig.3.
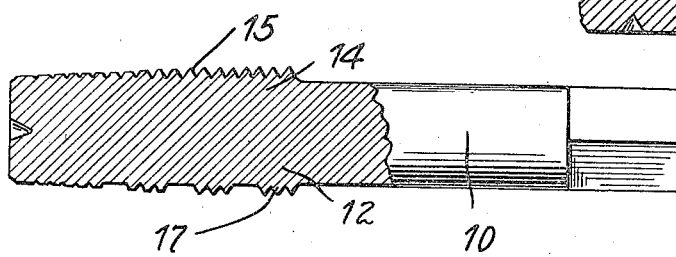
Fig.4.
Witnesses
M. S. Watson
Henry T. Bright
Inventor
A. E. Kehl
By 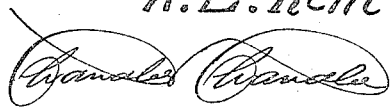
Attorneys

UNITED STATES PATENT OFFICE.

ALBERT E. KEHL, OF TORONTO, ONTARIO, CANADA.

MACHINE AND HAND TAP.

1,256,138.  Specification of Letters Patent.  Patented Feb. 12, 1918.

Application filed June 16, 1914. Serial No. 845,467.

*To all whom it may concern:*

Be it known that I, ALBERT E. KEHL, a subject of the King of England, residing at Toronto, in the Province of Ontario, Dominion of Canada, have invented certain new and useful Improvements in Machine and Hand Taps; and I do hereby declare the following to be a full, clear, and exact description of the invention, such as will enable others skilled in the art to which it appertains to make and use the same.

This invention relates to machine and hand taps for cutting internal screw threads.

The object of the invention resides in the provision of a tap embodying an improved construction whereby threads may be cut with accuracy through the medium of a single tap with great saving both in cost and time in the operation of machine and hand tapping.

A further object of the invention resides in the provision of a tap embodying an improved arrangement of teeth whereby the strain on the tap and the friction arising in the operation of tapping is reduced to a minimum and the life of the tap thereby materially lengthened.

A still further object of the invention resides in the provision of a tap which can be operated with less danger and at greater speed than the ordinary tap with the result that the output of work is materially enhanced.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which Figure 1 is a side elevation of a tap constructed in accordance with the invention;

Fig. 2, an end view of same;

Fig. 3, a section on the line 3—3 of Fig. 2, and

Fig. 4, a section on the line 4—4 of Fig. 2.

Referring to the drawings the improved tap is shown as comprising a stock 10 so shaped as to form a plurality of radial arms 11, 12, 13 and 14.

The arm 14 has formed on its outer end a full complement of thread cutting teeth 15, while the arm 11 has formed on its outer end less than a full complement of thread cutting teeth arranged in a series of four at the inner side of the arm and then a plurality of single spaced teeth. The arms 12 and 13 have formed on their outer ends a plurality of thread cutting teeth 17 and 18 respectively, the innermost teeth on each arm being arranged in several series of three. As stated the teeth on the arms 11, 12 and 13 are disposed in series spaced apart, the spaces between the series of teeth on the arm 12 being staggered with respect to the spaces between the series of teeth on the arm 11, while the spaces between the series of teeth on the arm 13 are staggered with respect to the spaces between the series of teeth on the arms 11 and 12.

By this arrangement it will be apparent that the spaces between the series of teeth will form a spiral channel to afford ample clearance to chips, while the staggered relation of the spaces will result in a gradual advance of the work and at the same time obviate a material amount of friction and strain so that the complete cutting of the thread can be accomplished with a single tap, which latter can be operated very rapidly without danger of breaking same.

What is claimed is:—

1. A tap comprising a stock having radial arms, one of said arms being provided with a full complement of thread cutting teeth, another and adjacent arm being provided with a series of four teeth at its inner side and a plurality of spaced single teeth, and the remainder of said arms being provided with a plurality of spaced series of three teeth disposed innermost thereon, the spaces between the teeth and the series of teeth on one arm being disposed in staggered relation to the spaces between the teeth and series of teeth on the other arm.

2. A screw tap having a plurality of cutting lips provided with teeth arranged in a helical line, one of said lips having teeth arranged at distances equal to double the pitch, two cutting lips, the teeth formed upon which are arranged in sets of three, said teeth of each set being spaced apart by a distance equal to the pitch, and the sets being set apart with respect to one another a distance equal to twice the pitch.

3. A screw tap having a plurality of cutting lips provided with teeth arranged in a helical line, one of said lips having teeth arranged at distances equal to double the pitch, two cutting lips, the teeth formed upon which are arranged in sets of three, said teeth of each set being spaced apart by a distance equal to the pitch, and the sets being set apart with respect to one another a distance equal to twice the pitch, the upper and lower portions of each of said lips having the full number of teeth.

In testimony whereof I affix my signature in the presence of two witnesses.

ALBERT E. KEHL.

Witnesses:
R. S. CAREY,
J. SCOTT CAMERON.

Copies of this patent may be obtained for five cents each, by addressing the "Commissioner of Patents, Washington, D. C."